United States Patent [19]

Hata et al.

[11] Patent Number: 4,465,615

[45] Date of Patent: Aug. 14, 1984

[54] ELECTROCONDUCTIVE RESIN COMPOSITION AND A VIDEODISC RECORD

[75] Inventors: Akio Hata; Hiroshi Kake; Noriki Fujii, all of Shinnan'yo, Japan

[73] Assignee: Tokuyama Sekisui Kogyo Kabushiki Kaisha, Osaka, Japan

[21] Appl. No.: 488,763

[22] Filed: Apr. 26, 1983

Related U.S. Application Data

[62] Division of Ser. No. 367,988, Apr. 13, 1982, Pat. No. 4,396,660.

[30] Foreign Application Priority Data

Apr. 22, 1981 [JP] Japan .................................. 56-61683

[51] Int. Cl.$^3$ .............................................. H01B 1/06
[52] U.S. Cl. .................................. 252/511; 524/504; 523/174; 525/317
[58] Field of Search ................ 252/511, 500; 525/317; 524/495, 496, 504; 358/342, 344; 362/126, 276; 523/174

[56] References Cited

U.S. PATENT DOCUMENTS

| | | | |
|---|---|---|---|
| 4,280,941 | 7/1981 | Datta et al. | 252/511 |
| 4,351,747 | 9/1982 | Miyamoto et al. | 252/511 |
| 4,378,310 | 3/1983 | Datta et al. | 252/511 |

Primary Examiner—Josephine Barr
Attorney, Agent, or Firm—Armstrong, Nikaido, Marmelstein & Kubovcik

[57] ABSTRACT

An electroconductive resin composition is a blend of 5-30% by weight carbon black and a graft-polymer. The graft-polymer is obtained by graft polymerizing 99-76 parts by weight of monomeric vinyl chloride to 1-15 parts by weight of an ethylenevinyl acetate copolymer, the ethylenevinyl acetate copolymer containing 10-65% by weight of vinyl acetate. The electroconductive resin composition has superior heat resistance and mechanical strength and improved flowability and heat stability. The electroconductive resin composition is particularly suitable for preparing video disc records.

4 Claims, No Drawings

ELECTROCONDUCTIVE RESIN COMPOSITION AND A VIDEODISC RECORD

This is a division of application Ser. No. 367,988, filed Apr. 13, 1982 now U.S. Pat. No. 4,396,660.

DETAILED EXPLANATION OF INVENTION

This invention relates to an electroconductive resin composition, more particularly, to a resin composition which has electroconductivity and is prepared by blending carbon black with a graft-polymer prepared by graft-polymerizing monomeric vinyl chloride to a copolymer of ethylene and vinyl acetate.

Polymer and copolymer of vinyl chloride are generally of good weatherability and of high mechanical strength, and have been used for preparing various shaped articles such as pipes, pipe joints and sheets. Recently, attempts have been made to prepare an electroconductive resin composition by incorporating an electroconductive filler into the polymer and copolymer of vinyl chloride. The electroconductive resin composition has been said to be adapted for preparing videodisc record of an electrostatic capacity system.

Among the electroconductive fillers, fine metal powders and carbon black are typical, and the latter has been most widely used. There are many kinds of carbon black. "Ketjen black", manufactured by Akzochemie, has been considered to have a remarkable effect for providing the resin with electroconductivity and to be most preferred.

As for the polymer and copolymers of vinyl chloride, it has hitherto been proposed that copolymer of vinyl chloride be used for mixing with the carbon black (as opposed to the use of polyvinyl chloride, i.e., a homopolymer of vinyl chloride) to form a material for videodisc records. For example, Japanese Unexamined Patent Publication No. 53- 115104 discloses that a resin composition is adapted for manufacturing videodisc records, which composition is prepared by mixing (1) 44 parts by weight of propylene-vinyl chloride copolymer containing 5% by weight of propylene with (2) 10 parts by weight of vinyl acetate-vinyl chloride copolymer containing 15% by weight of vinyl acetate and (3) 10 parts by weight of maleic acid ester-vinyl chloride copolymer containing 25% by weight of maleic acid ester, and further by adding thereto an electroconductive filler. The RCA Review, 1978, March at pages 87 to 115, discloses that homopolymers and binary copolymers of vinyl chloride may be used for preparation of the videodisc records.

It has hitherto been required that a large amount of the electroconductive material, especially carbon black be incorporated into a resin of a homopolymer or copolymer of vinyl chloride in order to provide the resin with electroconductivity. For instance, when 10 parts by weight of said Ketjen black EC is incorporated into 100 parts by weight of the resin, the resulting resin composition has a specific electric resistance of $10^5$ to $10^{10}$ $\omega$-cm, and when 20 parts by weight of said Ketjen black are incorporated into 100 parts by weight of the resin, the resulting resin composition has a specific electric resistance of approximately 1.0 to $10^3$ $\omega$-cm. Thus, in order to provide the resin with the electroconductivity the carbon black must be incorporated to count for more than 10% by weight of the composition. When such a large amount of carbon black is added, the resulting composition is deteriorated in flowability in a molten state, and shows the disadvantage that the composition is hard to fabricate. Furthermore, the carbon black tends to deteriorate heat stability of the vinyl chloride resin, and the resulting composition becomes deteriorated in the heat stability thereof.

The inventors contemplated to obtain a resin of a polymer or copolymer of vinyl chloride which maintains its superior inherent properties and is improved in both flowability when molten and heat stability when heated. For this purpose, the inventors prepared various resins of polymer and copolymer of vinyl chloride, mixed carbon black with the resin, and observed the properties of the resulting resin compositions. As a result, the inventors have found that, when the carbon black is added to a graft-polymer, which is obtained by graft-polymerizing monomeric vinyl chloride to a copolymer of ethylene and vinyl acetate, the resulting composition is superior in both heat resistance and mechanical strength and furthermore is improved in both flowability and heat stability. Still further, the inventors have found that the resulting composition is improved in impact resistance compared with a composition using a homopolymer of vinyl chloride. This invention has been made on the findings as mentioned above.

According to this invention there is provided an electroconductive resin composition which comprises a blend of 5 to 30% by weight of carbon black and a graft-polymer which is obtained by graft-polymerizing 99 to 76 parts by weight of monomeric vinyl chloride to 1 to 15 parts by weight of an ethylene-vinyl acetate copolymer, said copolymer containing therein 10 to 65% by weight of vinyl acetate.

There are various grades of ethylene-vinyl acetate copolymer available in the market and the grades are made by the differences in the cotent of vinyl acetate thereof, the averge molecular weight thereof, and the polymerizing method in which the copolymer was prepared. In general, when the amount of vinyl acetate contained in the copolymer is increased, the copolymer is improved in compatibility with monomeric vinyl chloride but is deteriorated in impact resistance, and adversely when the amount of vinyl acetate is decreased, the copolymer is improved in impact resistance but is deteriorated in compatibility with the monomeric vinyl chloride. Thus the content of vinyl acetate is preferably limited approximately from 10 to 65% by weight in the copolymer.

Average molecular weight of the ethylene-vinyl acetate copolymer is normally expressed by a melt index or Mooney viscosity. Among them, a method for determining the melt index is provided in ASTM (American Standard of Testing Method) D-1238. Based on the melt index, the copolymer has a good flowability but an unsatisfactory impact resistance, if it has a melt index more than 100. Conversely, if the melt index is less than 0.1, then the copolymer has a good impact resistance, but an unsatisfactory flowability. These values can be standards for forecasting the impact resistance and flowability of the graftpolymer, which is prepared by graft-polymerizing vinyl chloride to the ethylene-vinyl acetate copolymer.

Further, the ethylene-vinyl acetate copolymer has generally somewhat different properties according to the polymerization process in which the copolymer was prepared. However, when the electroconductive composition is to be prepared according to the present invention, the process by which the copolymer is prepared does not matter at all and processes such as suspension polymerization, emulsion polymerization, solution polymerization and high pressure polymerization, can be used. When it is intended to obtain a videodisc record, however, a copolymer is preferably used which is prepared by the solution polymerization and high pressure polymerization processes, because the copolymer prepared in said processes normally includes less impurities.

When the monomeric vinyl chloride is graft-polymerized to ethylene-vinyl acetate copolymer for use in the present invention, various processes may be employed such as an emulsion polymerization process, a suspension polymerization process, a solution polymerization process and a block polymerization process. Among the processes, the suspension polymerization process is preferred. The reason for this is that fine particles can be immediately obtained which can be readily blended with carbon black to form a uniform mixture. Particulars of a suspension polymerization process in which the graftpolymer can be prepared are disclosed in, for example, Japanese Patent Publication No. 39-27876. According to the disclosures, deionized water, a suspension stabilizer such as polyvinyl alcohol, a free radical generating agent, and if desired an agent for decreasing polymerizaton degree, are charged into a jacketed polymerization vessel, into which ethylene-vinyl acetate copolymer is then charged and suspended, the air contained in the vessel is discharged, and then vinyl chloride is introduced under pressure into the vessel. Thereafter, the vessel is heated through the jacket to dissolve the copolymer in the monomeric vinyl chloride, and graft-polymerization is initiated. When the graft-polymerization is initiated, heat is generated and cooling is carried out through the jacket, thus the polymerization is advanced to a desired extent. Thereafter, remaining monomeric vinyl chloride is discharged out of the vessel and recovered to obtain a slurry including graft polymer. The slurry is then dewatered, dried, and sieved to obtain fine particles of the graft polymer.

When the graft polymer is obtained in the manner as mentioned above, if another monomer is present besides monomeric vinyl chloride, then another graftpolymer can be obtained in which said monomer and monomeric vinyl chloride have been graft-copolymerized to the ethylene-vinyl acetate copolymer. The graftpolymer used in this invention may be a graftpolymer in which an additional monomer has been graft-copolymerized together with vinyl chloride to the ethylene-vinyl acetate copolymer. Monomeric vinyl acetate, ethylene and propylene are preferably used as the said additional monomer. The said monomer is preferably used in an amount less than 10% by weight with respect to the vinyl chloride. In the case wherein monomeric vinyl chloride is graft polymerized together with the additional monomer to the ethylene-vinyl acetate copolymer, the monomeric vinyl chloride and the additional monomer should be graft polymerized totally in an amount from 99 to 85 parts by weight to 1 to 15 parts by weight of said copolymer.

The graft polymer should preferably have a particular average polymerization degree. If the graft polymer has a very high polymerizaton degree, it has a very low flowability when molten, and adversely, if the graft polymer has a very low polymerization degree, it has a very low impact resistance and a very low heat resistance. The particular range of the polymerization degree is varied according to intended use. For example, in the case wherein a large amount of carbon black is incorporated into the graft polymer and precise moulding is required as in a videodisc record, the graft polymer should preferably have an average polymerization degree from about 300 to 550. In the case wherein it suffices to add a small amount of carbon black as in the preparation of packaging materials which are antielectrostatic and are hard to be electrified, the graft polymer should preferably have a polymerization degree as high as about 700, because the graft polymer of high polymerization degree produces advantageously a product of high mechanical strength.

In order to blend carbon black with the graft polymer to prepare the resin composition, usual blending apparatus may be used. Since the carbon black is generally small in bulk density and tends to agglomerate together, attention must be paid to agitate to disperse it uniformly in the resin. For example, a blending apparatus such as a Henschel Mixer should be preferably used which can provide the resin with high shear energy. Furthermore, according to the technique as taught by Japanese Unexamined Patent Publication No. 55-158919, preferably the carbon black may be at first made into fine particles less than 0.044 mm in diameter, which are then added gradually to the graftpolymer particles. Though there are many kinds of carbon black as mentioned above, the carbon black is normally added to the resin in an amount of 10 to 30% by weight.

Since the graft polymer is a polymer prepared from monomeric vinyl chloride, it tends to be decomposed by the heat given for the purpose of fabrication. Thus, in order to make it easy to fabricate the polymer, various additives such as stabilizers and lubricants may be preferably added which have hitherto been added. Besides the additives, a small amount of other resins may also be added. For instance, methyl methacrylate-styrene-butadiene copolymer, or chlorinated polyethylene, which are normally used in order to elevate impact resistance of polyvinyl chloride, may be added. Furthermore, other polymers or copolymers of vinyl chloride may also be added thereto. The resins such as "Telalloy" (Trade Mark) manufactured by Kanegabuchi Kagaku in Japan and "PN Resin" (Trade Mark) manufactured by Showa Denko in Japan, which are normally added in order to elevate heat resistance of polyvinyl chloride, may be added thereto. These polymers, copolymers or resins should be employed in the amount less than 20% by weight, preferably less than 10% by weight, based on the amount of the graft polymer. When additives are to be added, special attention should be paid to the kinds and the amounts of the additives. This is because, for example, in the case wherein a videodisc reocord is intended to be obtained, the additives are sometimes built up on the surface of a stamper while the videodisc record is produced, and as the result the videodisc record does not provide a clear picture.

The above-mentioned mixture is then kneaded to form a uniform composition, which is electroconductive. The composition, when compared with the case wherein homopolymer or binary copolymer of vinyl chloride is used, has the advantages that the composition can be easily fabricated due to excellent flowability when molten, notwithstanding the high heat resistance, and further that a product of the composition is hard to be broken due to excellent impact resistance. Thus the product of the composition is hard to be charged with static electricity owing to its own electroconductivity, and accordingly does not attract dust, and is adapted for use in packaging materials. Furthermore, since the composition is easily fabricated, it can be formed without difficulty into a disc having minute and delicate grooves, in addition the composition has excellent heat resistance and impact resistance, and therefore is best suited for preparing a videodisc record. Consequently, varied applications can be expected in this aspect.

As for the heat resistance of the vinyl chloride polymer, the graftpolymer is generally inferior in heat resistance to the homopolymer, however, the resin composition according to the invention is superior in heat resistance to the usual resin composition prepared by blending the homopolymer with carbon black in the same rate. This is quite unexpected. The reasons for this cannot be well understood. However, when solubility of the resin composition in tetrahydrofuran is investigated, the composition having a high heat resistance shows an increased insolubility and is supposed to be partly crosslinked. More particularly, according to conventional manners, when use is made of a polymer or copolymer of vinyl chloride alone or a mixture of said polymer or copolymer with ethylene-vinyl acetate copolymer, and when said polymer, copolymer or a mixture thereof is mixed further with carbon black to form an electroconductive composition, the composition is easily soluble in tetrahydrofuran. To the contrary, the resin composition according to this invention, wherein use is made of graftpolymer of vinyl chloride, is sparingly soluble in tetrahydrofuran. Therefore, the resin composition according to this invention should be considered not to be a simple mixture of a polymer and carbon black.

By way of Examples, this invention is explained to the full particulars.

EXAMPLE 1

At first, the following describes the general preparation of the graft polymer used as a raw material.

Into a polymerizaton vessel, capable of withstanding a pressure of 60 Kg/cm²G, having an inner volume of 160 liters, and provided with a jacket and stirrer, were charged deionized water, a polyvinyl alcohol derivative, dispersing agent, organic peroxide derivative free radical generating agent and a copolymer of ethylene and vinyl acetate. The vessel was then closed tightly, the air remaining in the vessel was discharged, monomeric vinyl chloride and another monomer were charged into the vessel, and suspension polymerization was carried out to prepare a graft polymer.

After the polymerization reaction was completed, the remaining monomers were recovered, dewatered, and dried to obtain particles of polymer, which particles were then sieved through a 32 mesh sieve to collect the fine particles. The fine particles are the desired portion of graft polymer. The graft polymer has the constituents and the average polymerization degree listed in Table 1 hereinbelow. In the Table hereinbelow, EVA represents a copolymer of ethylene and vinyl acetate, VAC represents the content of vinyl acetate, and MI the melt index.

TABLE 1

| No. | Kind and amount of EVA | Constituent of Graft Polymer (% by weight) | | Average polymerization Degree (JIS K-6721) |
|---|---|---|---|---|
| | | Content of monomer other than vinyl chloride | Content of vinyl chloride | |
| 1 | Ultrathene 634* | 6 | — | 94 | 360 |
| 2 | Ultrathene 760 VAC 40% MI 65 | 6 | — | 94 | 360 |
| 3 | Ultrathene 634 | 5 | Ethylene 2 | 93 | 400 |
| 4 | Ultrathene 634 | 6 | Propylene 4 | 90 | 400 |
| 5 | Ultrathene 634 | 6 | Vinyl Acetate 6 | 88 | 400 |
| 6 | Ultrathene 634 | 6 | Ethylene 1 Propylene 2 | 91 | 360 |
| 7 | Levapren** 450P | 6 | — | 94 | 360 |
| 8 | Evathlene*** 410P | 10 | — | 90 | 400 |
| 9 | Soarlex**** CH | 10 | — | 90 | 400 |
| 10 | Ultrathene 634 | 10 | — | 90 | 700 |

*EVA manufactured by a high pressure method by Toyo Soda Manufacturing Co. Ltd. in Japan, containing 26% of vinyl acetate and having a melt index of 4.
**EVA manufactured by a solution polymerization method by Bayer Co. in West Germany, having a VAC of 45% and having a Mooney viscosity of 20.
***EVA manufactured by an emulsion method by Dainippon Ink and Chemicals Co. in Japan, having a VAC of 60% and having a melt index of 1.
****EVA manufactured by a suspension polymerization method by Nippon Synthetic Chemical Industry Co. having a VAC of 60% and having a melt index of 15 to 50.

Carbon Black was added to each of said graft polymers at the mixing rate given in Table 2 hereinbelow to obtain a resin mixture.

TABLE 2

| Compounds to be mixed | Mixing rate | |
|---|---|---|
| | Weight (g) | Parts by weight |
| Graft Polymer | 1500 | 100 |
| Dibutyl Tin Mercaptide | 20 | 1.3 |
| Dibutyl Tin Laurate | 10 | 0.67 |
| Lubricant of amide Derivative | 23 | 1.53 |
| Lubricant of Monogryceride Derivative | 23 | 1.5 |
| Carbon Black (Ketjen black EC) | 300 | 20 |

In mixing, the resin was charged into a 10 liter Henschel mixer and mixed therein, carbon black being added during mixing. The temperature was elevated up to 50° C., the carbon black was dispersed uniformly, thereafter the stabilizer and lubricant were added thereto. The temperature was kept at 50°-60° C., and mixing was continued for 5 minutes. Thereafter the resulting mixture was cooled and removed from the mixer. Then 150 g of the mixture was kneaded by two rolls of 8 inch diameter to form a sheet of 0.5 mm thickness.

Thereafter, the sheet was interposed between ferrotype plates and pressed therein to obtain a sheet of 1 mm thickness having smooth surfaces. Further, test pieces for measuring heat resistance were prepared by press moulding, and using these pieces, there were measured flowability when molten, heat resistance, heat stability, bending strength, impact resistance, electroconductivity and hygroscopicity. Respective testing methods are explained hereinbelow.

Flowability when molten: The sheet was cut into a square sheet of 2 mm ×2 mm, which was charged into a Koka type flow tester. There was provided a nozzle of 1 mm $\phi \times 10$ mm, through which molten sheet was extruded under a pressure of 150 Kg/cm² at a temperature of 180° to determine the flowability.

Heat resistance: The sheet obtained by press moulding was tested according to the testing method provided in ASTM D-648 (using load of 18.6 Kg).

Heat stability: The sheet was put into a gear oven at 170° C., and the heat stability was estimated by the period of time elapsed until the sheet began to form.

Bending Strength: This was measured according to the method provided in ASTM D-790 (measuring temperature 20° C.) using the press moulded sheet.

Impact Resistance: The press moulded sheet of 1 mm thickness was cut into squares having sides of 2 cm in length, and each of the square sheets was used for a test piece. The test piece was set in a Du Pont type impact tester, and was observed under the following conditions:

| Impacting | forward end is rounded in the radius of ½ inch |
| --- | --- |
| Floor | flat |
| Weight | 300 g |
| Height | 2.5 cm |
| Measuring temperature | 20° C. |

Estimation

Tests were made using 12 test pieces, and the results were expressed by a numerical value based on the following standards:
0 : not broken
1 : cracked
2 : broken but not to pieces scattered into pieces
3 : broken and scattered into pieces Electroconductivity: A press moulded sheet of 1 mm thickness was cut into a rectangular sheet of 10 mm in width and 70 mm in length, which was used as a test piece. End portions extending 10 mm in length from both ends were polished by a sand paper, silver paste was then applied thereto, and the test piece was left in a room at 50% relative humidity for 24 hours. Thereafter, direct current voltage was applied to measure the electroconductivity.

Hygroscopicity: A square test piece of 5×5 mm was cut from a press moulded sheet having smooth surfaces and was left for 6 hours in a room of 95% relative humidity at 50° C. Thereafter the test piece was observed to find extraordinarily foamed pores by means of an optical microscope. The thus investigated results are listed in Table 3 hereinbelow.

TABLE 3

| | Results of observed properties | | | | | | |
| --- | --- | --- | --- | --- | --- | --- | --- |
| Resin No. | Flowability when molten $10^{-2}$ cm³/sec | Heat Resistance °C. | Heat Stability Minutes | Bending Strength Kg/cm² | Impact Strength — | Electro-conductivity $\Omega$-cm | Hygro-scopicity Number of Pores |
| 1 | 0.9 | 69 | 120 | 460 | 1.5 | 5 | 0 |
| 2 | 1.0 | 68 | 110 | 450 | 2.2 | 7 | 0 |
| 3 | 1.6 | 62 | 120 | 440 | 1.3 | 8 | 0 |
| 4 | 1.4 | 64 | 140 | 490 | 1.2 | 8 | 0 |
| 5 | 1.1 | 65 | 80 | 500 | 0.9 | 5 | 0 |
| 6 | 1.7 | 63 | 130 | 460 | 1.7 | 6 | 0 |
| 7 | 0.9 | 69 | 120 | 460 | 1.5 | 6 | 0 |
| 8 | 0.7 | 65 | 120 | 520 | 2.7 | 7 | 3 |
| 9 | 0.8 | 65 | 120 | 530 | 2.7 | 7 | 5 |
| 10 | 0.02 | 72 | 140 | 650 | 0.0 | 7 | 0 |

From Table 3 the following can be seen. The resin No. 10 in Table 3 has a low and inferior flowability because of a high polymerizaton degree, in contrast, the other resins have a high and superior flowability. That is, if the polymerizaiton degree is decreased, then the flowability is increased and improved, and if monomeric propylene or vinyl acetate is graft-polymerized together with monomeric vinyl chloride, then the flowability is increased. In spite of the increased flowability, the resins in Table 3 have all a high heat resistance and excellent electroconductivity. Further, when use is made of the ethylene-vinyl acetate copolymer prepared by an emulsion polymerization method (as in resin No. 8) or by a suspension polymerizaion method, the resulting graftpolymer has a high hygroscopicity and becomes inferior. When use is made of the ethylene-vinyl acetate copolymer having a low average polymerization degree, the resulting graftpolymer becomes rather inferior in impact resistance.

EXAMPLE 2

In this Example, preparation of graftpolymers and evaluation of the thus prepared graftpolymers were carried out in the same manner as in Example 1, Resin Nos. 1 and 10, except that use was made of 9 parts by weight of carbon black instead of 20 parts by weight of carbon black in Table 2 to form the mixture. The results are listed in Table 4.

TABLE 4

| | Results of observed properties | | | | | | |
|---|---|---|---|---|---|---|---|
| Resin No. | Flowability when molten $10^{-2}$ cm$^3$/sec | Heat resistance °C. | Heat Stability minutes | Bending strength kg/cm$^2$ | Impact resistance — | Electroconductivity Ω-cm | Hygroscopicity Number of Pores |
| 1 | 4.5 | 69 | 150 | 530 | 0.3 | $3 \times 10^8$ | 0 |
| 10 | 0.3 | 73 | 170 | 700 | 0.0 | $7 \times 10^8$ | 0 |

From Table 4 it can be seen that, in the cases wherein use is made of 9 parts by weight of carbon black, the resulting resin composition has not such a high electroconductivity that the composition can be used for preparing a videodisc record, but has sufficient electroconductivity so that the composition is adaptable for preparing a packaging material for use in preventing accumulation of an electrostatic charge. The resins in Table 4 have high heat resistance in spite of high flowability, and also have high impact resistance.

Comparative Example 1

In this Comparative Example, use was made of various resins outside of the scope of the present invention, and resin mixtures were prepared in the same manner as in Example 1, wherein the corresponding graftpolymers outside of the scope of the invention are listed in Table 5 hereinbelow.

TABLE 5

| | Resin | | |
|---|---|---|---|
| Resin No. | Resin Name | Constituent (Weight %) | Polymerization Degree |
| 21 | PVC Homopolymer manufactured by Tokuyama Sekisui K.K. | VC = 100 | 360 |
| 22 | Vinyl chloride-Vinyl Acetate copolymer manufactured by Nippon Zeon K.K. 400 × 150 P | VC = 88 VAC = 12 | 450 |
| 23 | Vinyl chloride-Ethylene copolymer manufactured by Tokuyama Sekisui K.K. | VC = 99 Et = 1 | 430 |
| 24 | Vinyl chloride-Propylene copolymer manufactured by Air Products and Chemicals Co. | VC = 93 Pr = 7 | 450 |
| 25 | Graftpolymer by grafting Vinyl Chloride to Ultrathene 634 | VC = 80 EVA = 20 | 400 |
| 26 | Resins blended resin No. 21 with Ultrathene 634 (Note 1) | PVC = 94 EVA = 6 | |

(Note 1) 1000 g of homopolymer of vinyl chloride in Resin No. 21, 60 g (in pellet form) of Ultrathene 634 and 2 liters of water were charged in an autoclave, the air was removed, 1 kg of monomeric vinyl chloride was thereafter charged, and the resulting mixture was heated at 50° C. for 2 hours to dissolve the Ultrathene. Thereafter the remaining monomeric vinyl chloride was discharged, water was removed, and the resulting product was dried to obtain a fine particulate mixture of vinyl chloride polymer particles and Ultrathene particles.

Using each of the resin in Table 5, a mixture was prepared in the same manner as in Example 1, then the properties of thus obtained compositions were evaluated in the same manner as in Example 1. The results are listed in Table 6.

TABLE 6

| | Results of observed properties | | | | | | |
|---|---|---|---|---|---|---|---|
| Resin No. | Flowability when molten $10^{-2}$ cm$^3$/sec | Heat Resistance °C. | Heat Stability minutes | Bending strength kg/cm$^2$ | Impact Resistance — | Electroconductivity Ω-cm | Hygroscopicity Number of pores |
| 21 | 0.6 | 68 | 100 | 410 | 2.9 | 8 | 0 |
| 22 | 1.2 | 64 | 40 | 470 | 0.5 | 7 | 0 |
| 23 | 0.5 | 66 | 110 | 410 | 2.3 | 7 | 0 |
| 24 | 1.8 | 56 | 150 | 490 | 0.7 | 9 | 0 |
| 25 | 1.6 | 63 | 120 | 500 | 0.0 | 6 | 0 |
| 26 | 1.2 | 69 | 100 | 480 | 3.0 | 5 | 0 |

When the results in Table 6 are compared with the results in Table 3, the compositions according to this invention are totally superior to the hitherto known compositions. Especially in respect of heat resistance, for example, when Resin No. 1 is compared with Resin No. 21, if the resin itself is observed, a graftpolymer of vinyl chloride is inferior in heat resistance to a homopolymer of vinyl chloride, however, if carbon black is mixed with the resin and kneaded to form a composition, then the heat resistance is reversed between the graftpolymer and the homopolymer, and the resulting graft polymer composition has a superior heat resistance compared with that of the homopolymer composition. Nevertheless, the graftpolymer composition has an better flowability than the homopolymer composition. This result is unexpected.

Furthermore, when Resin No. 1 is compared with Resin No. 26, it can be seen that the graftpolymer prepared by grafting vinyl chloride to EVA is superior in impact resistance to the resin mixture prepared by blending the homopolymer of vinyl chloride with EVA. This fact shows that the resin composition according to this invention brings about a remarkable effect.

Still further, among the resin compositions according to this invention, when use is made of an ethylene-vinyl acetate copolymer, which is prepared by a solution polymerization method or a high pressure polymerization method, and when monomeric vinyl chloride alone is grafted to said ethylene-vinyl chloride copolymer to obtain a graftpolymer or when a monomer mixture of vinyl chloride and ethylene, propylene, or vinyl acetate is graft polymerized to said ethylene-vinyl acetate copolymer to form a graftpolymer, the resulting graft-polymer is adapted for use in preparing a videodisc record.

I claim:

1. An electroconductive resin composition consisting essentially of blend of 5 to 30% by weight of carbon black and a graftpolymer which is obtained by graft-polymerizing 99 to 76 parts by weight of monomeric vinyl chloride to 1 to 15 parts by weight of an ethylene-vinyl acetate copolymer, said copolymer containing therein 10 to 65% by weight of vinyl acetate.

2. An electroconductive resin composition according to claim 1 wherein the graft-polymer has a polymerization degree between 300 and 550.

3. A electroconductive resin composition according to claim 1 or 2 wherein the ethylene-vinyl acetate copolymer is prepared according to either a high pressure polymerization method or a solution polymerization method.

4. An electroconductive resin composition according to claim 3 wherein the graft-polymer is a polymer obtained by graft-polymerizing to said ethylene-vinyl acetate copolymer simultaneously the monomeric vinyl chloride and less than 10% by weight based on the monomeric vinyl chloride of a monomer selected from the group consisting of monomeric ethylene, propylene and vinyl acetate.

* * * * *